United States Patent
Meakin

(10) Patent No.: US 9,949,424 B2
(45) Date of Patent: Apr. 24, 2018

(54) SEED PREPARATION

(71) Applicant: Sirius Minerals PLC, London (GB)

(72) Inventor: Robert Meakin, Yorkshire (GB)

(73) Assignee: Sirius Minerals PLC, London (GB)

( * ) Notice: Subject to any disclaimer, the term of this patent is extended or adjusted under 35 U.S.C. 154(b) by 0 days.

(21) Appl. No.: 15/316,120

(22) PCT Filed: Jun. 1, 2015

(86) PCT No.: PCT/GB2015/051591
§ 371 (c)(1),
(2) Date: Dec. 2, 2016

(87) PCT Pub. No.: WO2015/185906
PCT Pub. Date: Dec. 10, 2015

(65) Prior Publication Data
US 2017/0121233 A1    May 4, 2017

(30) Foreign Application Priority Data

Jun. 2, 2014  (GB) .................................... 1409799.2
Jun. 6, 2014  (GB) .................................... 1410115.8

(51) Int. Cl.
*A01C 1/06*      (2006.01)
*C05D 1/00*      (2006.01)
*C05G 3/00*      (2006.01)

(52) U.S. Cl.
CPC ................ *A01C 1/06* (2013.01); *C05D 1/00* (2013.01); *C05G 3/0052* (2013.01)

(58) Field of Classification Search
CPC ........... A01C 1/06; C05D 1/00; C05G 3/0052
USPC ............................................. 47/57.6; 504/100
See application file for complete search history.

(56) References Cited

U.S. PATENT DOCUMENTS

| | | | | |
|---|---|---|---|---|
| 4,251,952 A | * | 2/1981 | Porter ...................... | A01C 1/06 47/57.6 |
| 5,188,654 A | * | 2/1993 | Manalastas ............ | A01N 25/26 428/334 |
| 5,435,821 A | | 7/1995 | Duvdevani et al. | |
| 5,623,781 A | * | 4/1997 | Legro ...................... | A01C 1/06 47/57.6 |
| 5,994,265 A | | 11/1999 | Barclay et al. | |

(Continued)

FOREIGN PATENT DOCUMENTS

| CN | 1246283 A | 3/2000 |
|---|---|---|
| CN | 1437852 A | 8/2003 |

(Continued)

OTHER PUBLICATIONS

Database Biosis (Online) Biosciences Information Service, Philadelphia, PA, US; 1991, Barbarick K A: "Polyhalite Application to Sorghum-Sudangrass and Leaching in Soil Columns", Soil Science, vol. 151, No. 2, 1991, pp. 159-166.

(Continued)

*Primary Examiner* — Monica L Williams
*Assistant Examiner* — Magdalena Topolski
(74) *Attorney, Agent, or Firm* — Mintz Levin Cohn Ferris Glovsky and Popeo, P.C.

(57) ABSTRACT

A coated seed product, the product comprising: at least one plant seed; and a coating adhered to the exterior of the plant seed, the coating comprising one or more evaporite minerals, preferably polyhalite.

18 Claims, 3 Drawing Sheets

(56) References Cited

U.S. PATENT DOCUMENTS

| | | |
|---|---|---|
| 6,156,699 A | 12/2000 | Johnson et al. |
| 6,582,637 B1 | 6/2003 | Phinney |
| 2001/0042494 A1 | 11/2001 | Welshimer et al. |
| 2003/0022790 A1* | 1/2003 | Hero ............... A01C 1/06 504/100 |
| 2003/0135957 A1 | 7/2003 | Phinney |
| 2004/0152596 A1* | 8/2004 | Peltonen ........... A01C 1/06 504/100 |
| 2006/0010946 A1 | 1/2006 | Mayhew et al. |
| 2012/0220454 A1* | 8/2012 | Chen ............... A01N 25/00 504/100 |

FOREIGN PATENT DOCUMENTS

| | | |
|---|---|---|
| CN | 101503322 B | 3/2012 |
| DE | 3618058 C1 | 2/1987 |
| DE | 102006034621 A1 | 1/2008 |
| EP | 2392204 A1 | 12/2011 |
| FR | 2612812 A1 | 9/1988 |
| GB | 983920 A | 2/1965 |
| GB | 1465979 A | 3/1977 |
| JP | S5269711 A | 6/1977 |
| JP | S54130311 A | 10/1979 |
| JP | S6170906 A | 4/1986 |
| JP | H0458805 A | 2/1992 |
| SU | 925869 A1 | 5/1982 |
| SU | 1456395 A1 | 2/1989 |
| WO | WO-2004/046064 A1 | 6/2004 |
| WO | WO-2014/026048 A2 | 2/2014 |

OTHER PUBLICATIONS

International Search Report Issued in PCT/GB2015/051592 dated Sep. 16, 2015.
Search Report Issued in GB1409799.2 dated Dec. 19, 2014.
Search Report Issued in GB1410115.8 dated Oct. 4, 2014.
International Search Report issued in International Patent Application No. PCT/GB2015/051591, dated Sep. 16, 2015 (Sep. 16, 2015). 5 pages.

* cited by examiner

SEED PREPARATION

CROSS-REFERENCES TO RELATED APPLICATIONS

This application is a national stage entry, filed under 35 U.S.C. § 371, of International Application No. PCT/GB2015/051591, filed on Jun. 1, 2015, and claims the benefit of and priority to UK Patent Application No. GB1409799.2, filed Jun. 2, 2014, and UK Patent Application No. GB1410115.8, filed Jun. 6, 2014, the entire contents of each are hereby incorporated herein by reference in their entireties and for all purposes.

This invention relates to the preparation of seeds.

It is known to treat seeds and/or seedbeds in order to improve the seeds' germination and/or growth. The preparations used for these purposes may include fertilisers, biostimulants, pesticides, fungicides and bacteria. For example, U.S. Pat. No. 6,582,637 discloses encapsulating seeds with a composition that can include blends of various sulphates, soda ash, sulphur and potash as part of a compost coating. GB 983,920 discloses coating seeds with hydrophobic compounds which could include metal salts. An example composition disclosed in GB 983,920 includes potash waterglass (i.e. potassium silicate).

Whilst coating seeds with fertiliser might intuitively seem an attractive approach, in practice it has considerable difficulties. In particular, many fertiliser compositions that are effective when applied to a seedbed have been found to be unsuitable for coating seeds due the fact that they impair germination. (See, e.g., GB 983,920 at page 1, lines 11 to 15). There may be various reasons for this effect, but one is believed to be the creation of an excessively saline environment adjacent to the seed. Excessive salinity can desiccate the seed and the environment around it. It is generally considered that many fertiliser compositions should be applied no closer than, e.g. 5 to 10 cm from newly sown seeds. On account of these effects the fertiliser compositions that are used for coating seeds on a commercial basis are in general formulated specially for that purpose.

It would be desirable to have a material that could be readily manufactured, and that could improve the germination and/or growth of seeds when applied to the seeds as a coating.

According to one aspect of the present invention there is provided a coated seed product, the product comprising: at least one plant seed; and a coating adhered to the exterior of the plant seed, the coating comprising one or more evaporite minerals.

According to a second aspect of the present invention there is provided a method of forming a coated seed product comprising: forming a slurry comprising an evaporite mineral powder and a binder; applying the slurry to plant seeds so as to coat the seeds with the slurry; and drying the seeds to stabilise the coating.

The coating may comprise more than 50%, 60%, 70%, 80%, 90% or 95% by weight of the evaporite mineral(s).

The one or more evaporite minerals may comprise polyhalite. The one or more evaporite minerals may principally comprise polyhalite. The evaporite mineral content of the coating may be essentially solely of polyhalite.

The coating may comprises more than 50%, 60%, 70%, 80%, 90% or 95% polyhalite by weight.

The one or more evaporite minerals may be in the form of a powder. The number average grain size of the powder may be less than 500 µm.

The average thickness of the coating may be in the range from 0.1 mm to 2.0 mm. The average thickness of the coating may be in the range from 0.1 mm to 1.0 mm.

The mass of the coating may be in the range from 1 to 500 g per kg of seed. The mass of the coating may be in the range from 1 to 20 g per kg of seed. The mass of the coating may be in the range from 1 to 10 g per kg of seed. The mass of the coating averaged over a representative sample of the product may be in the range from 1 to 20 g per kg of seed or 1 to 10 g per kg of seed. That sample may contain more than 1000 or more than 10,000 seeds. The mass of the sample may be greater than 10 kg.

An aspect of the invention may be a coated seed product comprising a certain amount of content, the product comprising: at least one plant seed; and a coating adhered to the exterior of the plant seed, the coating comprising one or more evaporite minerals; wherein the mass of the coating is (a) above any of 1, 2, 3, 4 or 5 g per kg of seed and/or (b) less than any of 10, 12, 15, 18 or 20 g per kg of seed. The content may be more than any of 10 kg, 25 kg, 100 kg or 1000 kg and/or above 1000, 10,000 or 100,000 seeds.

The seed product may be a bulk seed product.

The seeds may be unsown seeds.

The seed may be a seed of a crop species. The seed may be a seed of a non-crop species.

The coating may comprise a binder whereby the one or more evaporite minerals is/are adhered to the exterior of the seed. The coating may comprise a matrix of binder in which particles of the one or more evaporite minerals are embedded. The coating may fully or partially enclose the seed. The binder may be susceptible to degradation on exposure to moisture. The binder may be such as to release at least 50% of the mineral particles embedded therein on exposure to an atmosphere having a relative humidity of 90% for two weeks.

The coating may be adhered directly to the exterior of the plant seed. The product may comprise an intermediate layer adhered directly to the exterior of the plant seed, and wherein the coating may be adhered to the intermediate layer. The intermediate layer may form a barrier layer between the exterior of the plant seed and the coating.

The seed may be a seed of beet, lettuce, oil seed rape, pea, rice or wheat, or of another plant.

The method may comprise mining the evaporite mineral(s). The method may comprise crushing the as-mined evaporite mineral(s) to form powder.

The present invention will now be described by way of example with reference to the accompanying drawings.

Figure 1A:
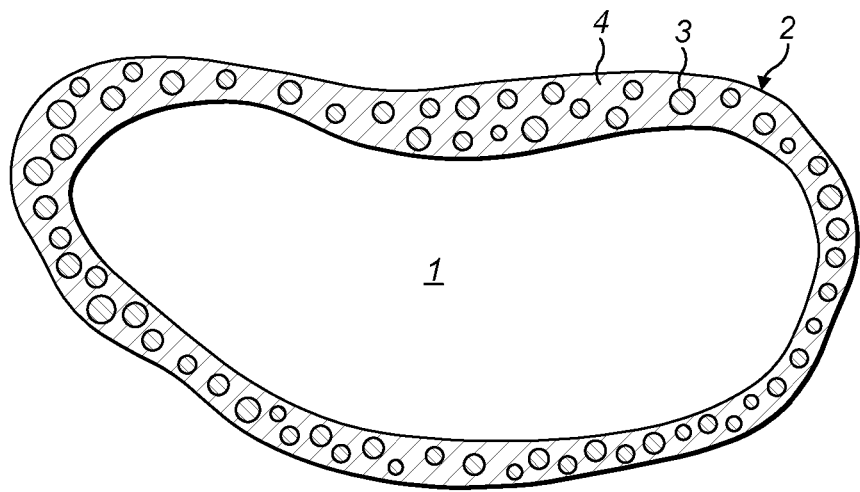
FIG. 1A shows a cross-section through a coated seed.

FIG. 1A shows a seed 1 having an exterior coating 2. The coating comprises a matrix 4, which is made up primarily of a binder, and particles 3. The particles are particles of an evaporite mineral, preferably polyhalite. It has been found that seeds provided with such a coating can exhibit improved germination and/or growth over uncoated seeds.

Figure 1B:
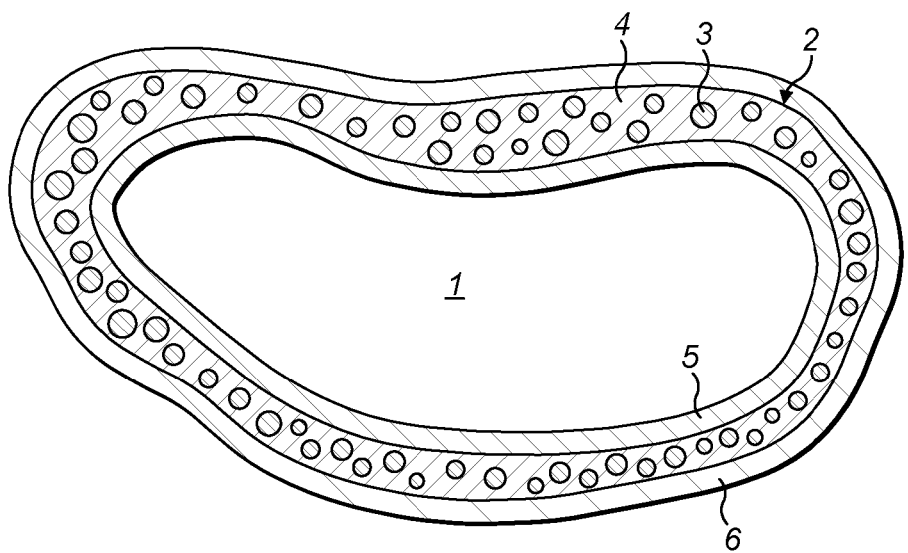
FIG. 1B shows a cross-section through another coated seed.

FIG. 1B shows a seed 1 having an exterior coating 2. The coating comprises a matrix 4, which is made up primarily of a binder, and particles 3. The coating may be adhered directly to the exterior surface of the seed or alternatively there may be one or more intermediate layers between the exterior surface of the seed and the exterior coating 2. For example, the seed 1 also has a barrier layer 5 that is applied to the exterior of the seed 1. The barrier layer 5 may be generally closer to the exterior of the seed 1 than the exterior coating 2. The barrier layer 5 may provide protection to the seed 1 from being in contact with the exterior coating 2. The seed 1 may also have a shell 6 applied to the exterior of the seed 1. The shell 6 may be applied to the exterior of the exterior coating 2. The shell 6 may therefore be generally farther from the exterior of the seed 1 than the exterior coating 2. The shell 6 may protect the coated seed from moisture during storage and/or before the seed is sown. The shell 6 may also be coloured so that it can be established where the seeds have been sown. Although three layers are shown in FIG. 1B, the seed may have one or more layers of material adhered to the exterior of the seed.

Polyhalite is a complex hydrated sulphate of potassium, calcium and magnesium of general formula $K_2Ca_2Mg(SO_4)_4 \cdot 2H_2O$. Polyhalite has a Moh's hardness of around 2.5 to 3.5.

Once mined, polyhalite may be broken into blocks or chips of suitable size for transport and processing. For example, referring to FIG. 2, the as-mined rock may be fed to crushers such as jaw crushers 11 and/or cone crushers 12 in order to yield a chipped material of generally uniform size. It has been found that chips of largest dimension no greater than around 20 mm and/or of average dimension between 5 and 10 mm are convenient for transportation from a mine.

The raw or chipped polyhalite is processed to form a polyhalite powder. This may suitably be done by milling, for examplying in a ball mill (e.g. a continuous "Hardinge" ball mill) and more preferably an attritor mill 13. In an attritor mill the feedstock is agitated together with freely moving grinding elements such as steel balls. Air-swept suction may be applied in order to draw the milled material out of the mill. This allows the milling to be performed as a continuous process if desired, with chipped feedstock being added to the mill and powder being swept out of the mill by gas flow whilst the grinding elements continue to be agitated. The average grain size of the powder is dependent on various process parameters including the dwell time of the feedstock in the mill. Conveniently, the mill may be arranged to produce polyhalite powder grain size in the range from 50 to 400 μm, more preferably from 100 to 250 μm. Conveniently at least 50% or more preferably at least 70% of the mass of the polyhalite powder is composed of grains having a grain size, or a largest or average diameter, in the range from 50 to 400 μm, more preferably from 100 to 250 μm. Conveniently 90% by number of the grains of the powder are smaller than 500 μm in diameter. The grain size may be as measured by means of a Malvern Mastersizer 2000 or as measured by means of a sieve shaker.

In the next processing step a binder is added to the polyhalite powder, along with a liquid such as water, in a mixer 14. The binder helps the polyhalite powder to adhere to seeds and increases the strength of the eventual seed coating. That is important because the pellets should preferably be capable of resisting mechanical breakdown when spread through conventional agricultural drilling machinery. Any suitable binder may be used. Examples include starch, lignosulphates, sugars, milled grain, synthetic polymers such as polyvinyl acetate and dedicated seed coating binders such as Sepiret which is available from Agrichem (International) Limited. The optimal amount of binder may be determined by balancing the strength of the final coating with its ability to break down once spread on a growing medium. If too little binder is added then the resulting coated seeds may have insufficient strength and the coating may fall off the seeds during transport or drilling. If excess binder is added then the seed coating can be too resistant to breakdown in the field, impairing germination and/or growth of the seeds. One or more solid or liquid adjuvants may also be added. When it is added to the polyhalite powder the binder may be in dry form, e.g. as a powder, or in liquid form, e.g. as a suspension or solution in a liquid carrier.

Figure 2:
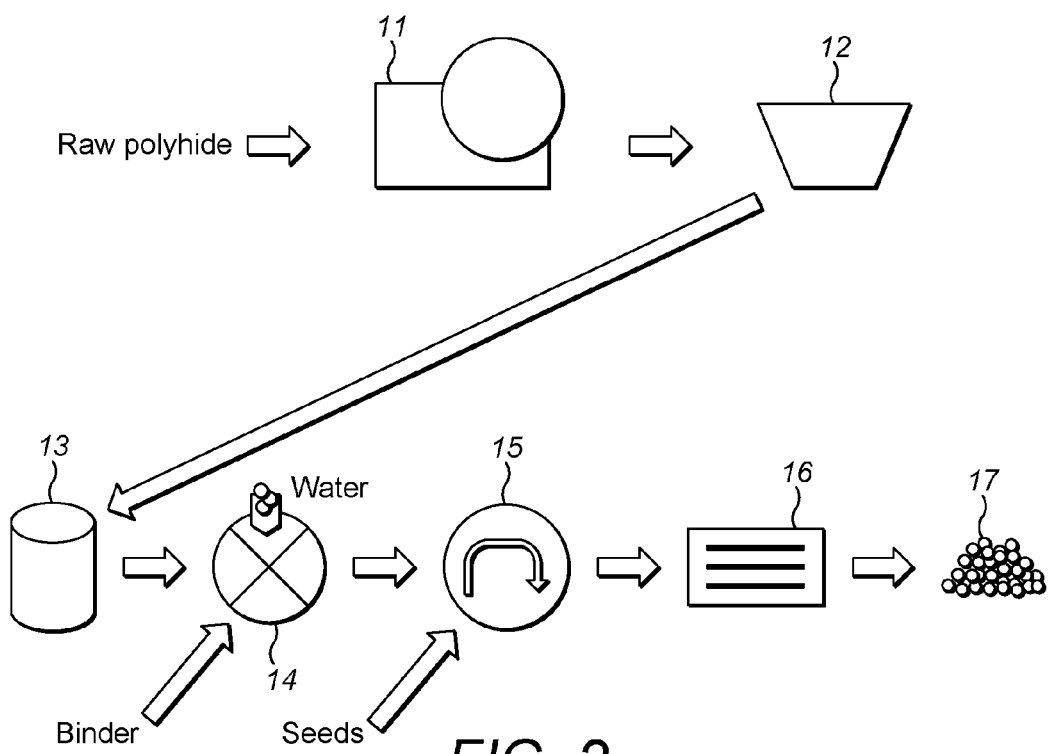
FIG. 2 illustrates a process for manufacturing coated seeds.

In FIG. 2 a single mixer 14 is shown as combining the polyhalite powder, water and binder. In practice, it may be desirable to first combine the polyhalite and the binder in dry form and then to add the water. This can improve the homogeneity of the resulting slurry. To achieve this, the dry components (if the binder is added in dry form) could be mixed in a first mixer until homogeneous, and then transferred to a second mixer where water is added to form a slurry. Alternatively, the dry components could be combined in a mixer and then water added to that mixer once the dry components had been mixed.

The slurry is introduced to a rotating drum 15, along with seeds. The drum tumbles or rolls the seeds together with the slurry in order to coat the seeds with the slurry. The slurry may be sprayed into the drum.

Then the coated seeds pass to a dryer 16 which drives off excess moisture and stabilises (e.g. hardens) the coating, forming a supply of coated seeds as illustrated at 17. The seeds can then be packaged and transported to the growing site for planting or spreading.

The coated seeds may form a coated seed product, which may comprise many such seeds.

Once the seeds have been sown on or in a growing medium, the coating breaks down in the presence of moisture. That permits the moisture to reach the seed, assisting in inducing it to germinate.

The seeds could be coated using other processes. For example, the seeds could be coated in binder and then tumbled in the polyhalite powder; or the seeds could be tumbled in polyhalite powder without binder, to cause a dusting of polyhalite powder to adhere to the seeds.

Additional components could be included in the coating. Such components may be any one or more of the following, in any combination:
- a component having the effect of chemically and/or mechanically stabilising and/or preserving the seeds: for example to increase their storage life, reduce their susceptibility to environmental contaminants or to reduce the likelihood of them being broken up during drilling/sowing;
- a component having the effect of enhancing the fertilising effect of the polyhalite: for example by accelerating or retarding the breakdown of the polyhalite in the field;
- a component having the effect of protecting or enhancing the growth of crops by means other than fertilising: for example a herbicide, fungicide, insecticide, rodenticide, hormone, plant stimulant or mycorrhizal fungus or spore;
- a fertiliser composition: for example a source of nitrogen and/or phosphorus and/or any other biologically active ingredient such as boron, cobalt to promote growth of the plant seed or partner organisms;
- a pigment;

a component having the effect of altering soil pH: for example lime, sulphur or a sulphate;

an inert porous matrix might be added to permit improved water, air or nutrient passage to the seed.

Such a component may be added at various stages in the process, for example it could be combined with the polyhalite powder before or after the formation of a slurry as described above, or with the binder prior to the mixing stage as described above, or it could be sprayed or otherwise coated on to the seeds before or after drying. The component could be sprayed or otherwise coated on to the seeds before the seeds are coated with the slurry, for example one or more components could be applied to the seed prior to the seeds being coated by the slurry.

As shown in FIGS. 1A and 1B, the exterior coatings of seed 1 may be formed of one or more layers and one or more of the additional components described above may be present in at least one of those layers. For example, the barrier layer 5, or first layer, may comprise a component having the effect of protecting or enhancing the growth of crops by means other than fertilising may form the barrier, or first, layer 5. The barrier layer 5 may comprise a hycorrhizal fungus or spore. The barrier layer 5 may be sprayed, dusted, or otherwise coated on to the seeds before the slurry is applied. The shell 6 may comprise a component having the effect of enhancing the fertilising effect of the polyhalite by retarding the breakdown of the polyhalite. The shell 6 may provide a moisture barrier that retards water passage to the exterior coating 2. This moisture barrier may protect the exterior coating 2 from water whilst the coated seed product is in storage, but breakdown once the seed has been sown and subject to an increased level of moisture. The shell 6 may also be coloured so that the location of the sown seeds can be identified. The shell 6 may be formed of broken-down egg shell.

In practice, the mean thickness of the coating could be in the range from 0.1 to 1.0 mm, the mean thickness of the coating could also be in the range from 0.1 to 2.0 mm, but the range can be chosen to suit the seed in question and the desired mass of polyhalite per seed.

The coating could, for example, contain above 50%, above 60%, above 70% above 80%, above 90% or above 95% polyhalite by weight.

The mass of polyhalite with which each seed is coated can be controlled through the choice of binder, the relative proportions of binder and polyhalite in the slurry, the viscosity of the slurry, the dwell time of the seeds in the drum 5 and the spraying rate of slurry into the drum 5.

The response of seeds to a polyhalite coating has been found to vary depending on factors including the species of the seed and the medium in which the seed was grown. In trials conducted on a range of crop seeds including rice, wheat, peas, lettuce, oil seed rape and beet no phytotoxic effects of the coating were observed at doses of polyhalite up to at least 50 g per kg of seed. However, the same trials suggested that good benefits could be had from polyhalite at significantly lower dose rates, with a correspondingly lower cost of polyhalite. In general, the preferred dosage rate of polyhalite is in a range from 1 to 20 grams per kg of seed, more preferably from 1 to 10 grams per kg of seed.

The seed may be a seed of an angiosperm and/or of a crop species. The seed may be a seed of a cereal species such as wheat, maize, rice, millet, barley, oats or rye. The seed may be a seed of a root vegetable species such as beet. The seed may be a seed of a pulse such as peas. Other examples include lettuce and oil seed rape. The seed may be a seed of a non-crop species.

In trials it has been found that the polyhalite coating can have a particularly strong effect in promoting initial growth of the seed, especially initial aerial growth. This can be especially valuable in enabling the seedling to survive damage from parasites, pests, pathogenic disease and adverse environmental conditions. For example, a seed that puts on strong early aerial growth may be more resistant to attack by ground-based pests such as slugs. A plant that has improved root development may be more robust to rain storm events in early growth.

Trials were conducted to assess the effectiveness of the polyhalite coating on the germination and early growth of seeds.

EXAMPLE 1

Rice seeds were coated with polyhalite at ranges from 2 to 52 grams of polyhalite per kg of seed. The seeds were grown under semi-controlled conditions alongside uncoated rice seeds using sand and compost as the growing media. The heights of the plants were measured 11 days after application of the seeds (11 DAA). The average height of the untreated seeds was around 5.3 cm in compost and 7.4 cm in sand. A significant increase in plant height was recorded for the seeds coated with around 2 to 25 grams of polyhalite per kg of seed. For example, the average plant height for seeds coated with 2 g of polyhalite per kg of seed grown in compost was around 10.5 cm and the average plant height for seeds coated with 8 g of polyhalite per kg of seed grown in sand was around 12.0 cm.

Figure 3:
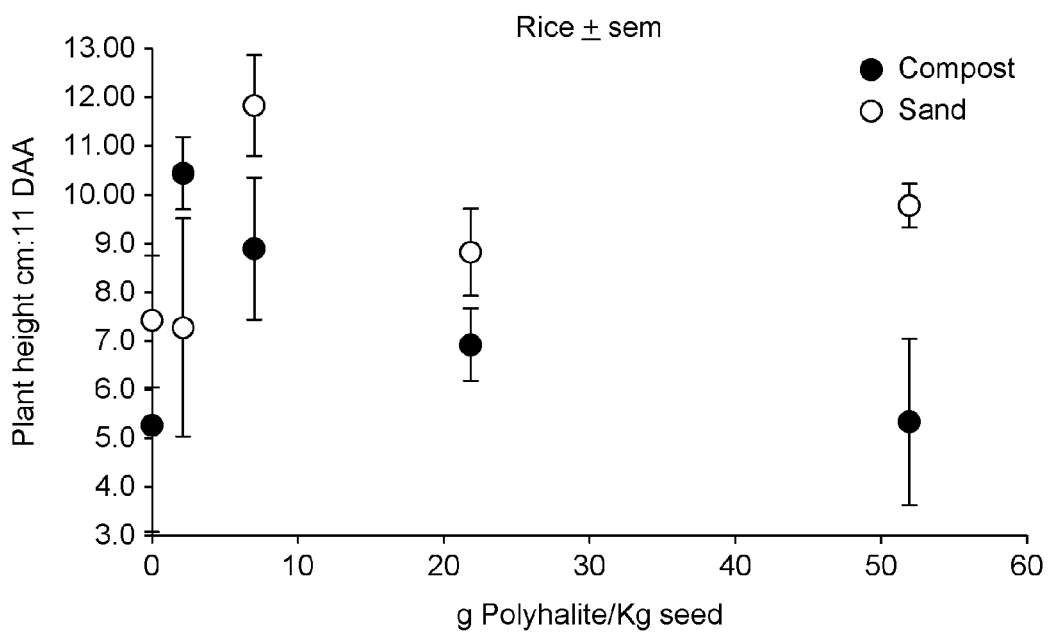
FIG. 3 illustrates the results of tests performed on rice seeds.

These results are illustrated in FIG. 3.

EXAMPLE 2

Wheat seeds were coated with polyhalite at ranges from 2 to 47 grams of polyhalite per kg of seed. The seeds were grown under semi-controlled conditions alongside uncoated wheat seeds using sand and compost as the growing media. The heights of the plants were measured 15 days after application of the seeds. The average height of the untreated seeds was around 24.9 cm in sand. A significant increase in plant height was recorded for the seeds coated with around 2 to 10 grams of polyhalite per kg of seed. For example, the average plant height for seeds coated with 2 g of polyhalite per kg of seed grown in sand was around 26.2 cm and the average plant height for seeds coated with 8 g of polyhalite per kg of seed grown in sand was around 26.9 cm.

Figure 4:
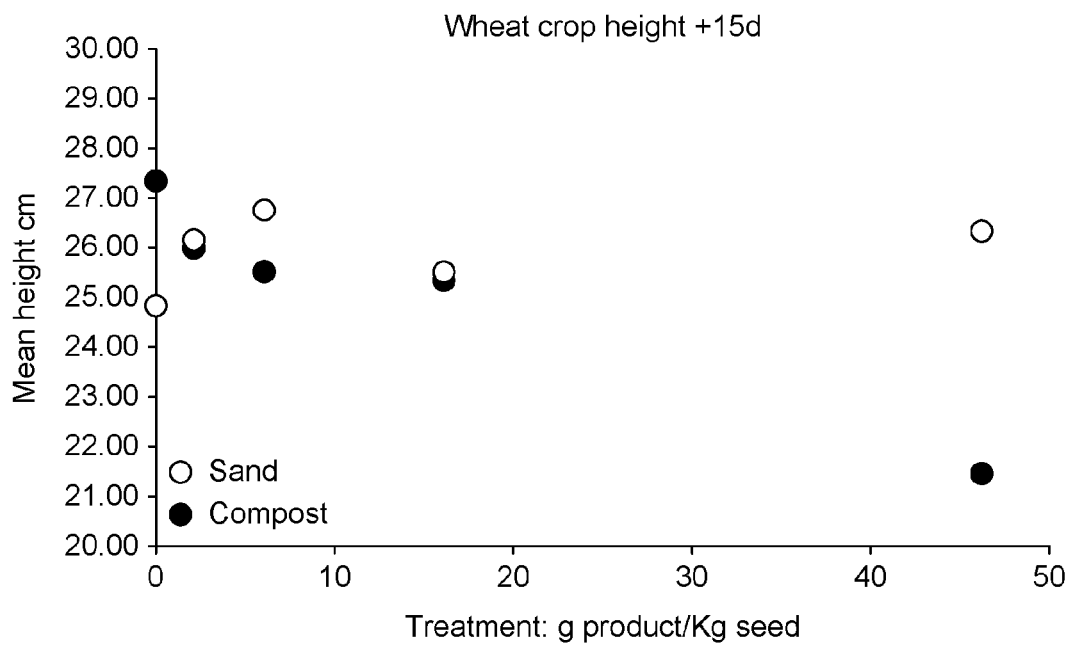
FIG. 4 illustrates the results of tests performed on wheat seeds.

These results are illustrated in FIG. 4.

In this example a similar response was not observed for the seeds grown in compost. This may be due to the compost providing a greater level of nutrients than the sand.

EXAMPLE 3

Pea seeds were coated with polyhalite at ranges from 2 to 28 grams of polyhalite per kg of seed. The seeds were grown under semi-controlled conditions alongside uncoated pea seeds using sand and compost as the growing media. The heights of the plants were measured 15 days after application of the seeds. The average height of the untreated seeds was around 6.9 cm in sand. A significant increase in plant height was recorded for the seeds coated with around 2 to 10 grams of polyhalite per kg of seed. For example, the average plant height for seeds coated with 2 g of polyhalite per kg of seed grown in sand was around 7.6 cm and the average plant height for seeds coated with 5 g of polyhalite per kg of seed grown in sand was around 7.8 cm.

Figure 5:
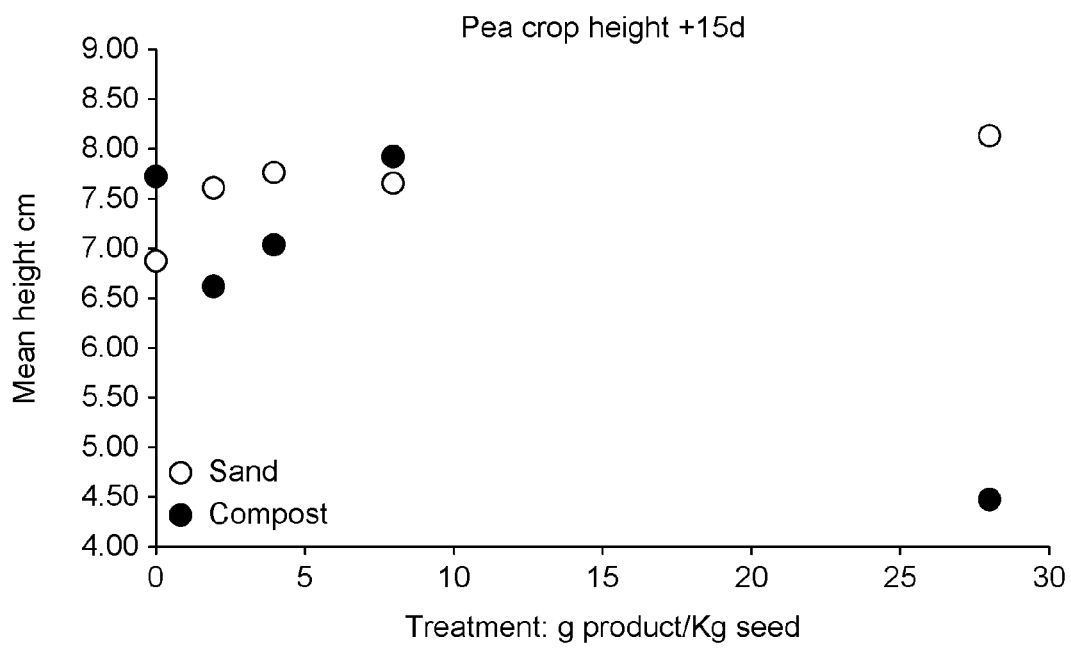
FIG. 5 illustrates the results of tests performed on pea seeds.

These results are illustrated in FIG. 5.

OTHER EXAMPLES

Similar trials were conducted using seeds of lettuce, beet and oil seed rape. These also showed benefits from the use of polyhalite coatings, particularly at levels below 20 g of polyhalite per kg of seed.

One potential mechanism for the observed improvement in initial growth is that the polyhalite may bring about an improvement in the microfungal environment adjacent to the seeds.

The process as described above may be used for coating seeds with minerals other than polyhalite, and in particular for coating seeds with one or more evaporite minerals, especially sulphite or chloride minerals. These may include any one or more of anyhdrite, carnalite, gypsum, halite, kainite, kieserite, langbeinite, polyhalite and/or sylvite. The loadings and dosages of such minerals may be as discussed above for polyhalite. The mineral incorporated in the coating may contain one or more of potassium, calcium or magnesium. The mineral incorporated in the coating may be a hydrated sulphate, particularly a hydrated sulphate of one or more alkali metals or alkali earth metals.

Where numeric values are specified above, they may be average values over the seeds in a coated seed product.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A coated seed product, the product comprising:
   at least one plant seed; and
   a coating adhered to the exterior of the plant seed, the coating comprising one or more evaporite minerals, wherein the one or more evaporite minerals comprise polyhalite.

2. The coated seed product as claimed in claim 1, wherein the coating comprises more than 50% by weight of the one or more evaporite mineral(s).

3. The coated seed product as claimed in claim 1, wherein the coating comprises more than 50% polyhalite by weight.

4. The coated seed product as claimed in claim 1, wherein the one or more evaporite minerals are in a form of a powder.

5. The coated seed product as claimed in claim 4, wherein a number average grain size of the powder is less than 500 μm.

6. The coated seed product as claimed in claim 1, wherein an average thickness of the coating is in a range from 0.1 mm to 2.0 mm.

7. The coated seed product as claimed in claim 1, wherein an average thickness of the coating is in a range from 0.1 mm to 1.0 mm.

8. The coated seed product as claimed in claim 1, wherein a mass of the coating is in a range from 1 to 500 g per kg of seed.

9. The coated seed product as claimed in claim 1, wherein a mass of the coating is in a range from 1 to 20 g per kg of seed.

10. The coated seed product as claimed in claim 9, wherein the mass of the coating is in a range from 1 to 10 g per kg of seed.

11. The coated seed product as claimed in claim 1, wherein the plant seed is a crop species.

12. The coated seed product as claimed in claim 1, wherein the seed is a beet, lettuce, oil seed rape, pea, rice or wheat.

13. The coated seed product as claimed in claim 1, wherein the plant seed is a non-crop species.

14. The coated seed product as claimed in claim 1, wherein the coating comprises a binder whereby the one or more evaporite minerals is/are adhered to the exterior of the seed.

15. The coated seed product as claimed in claim 1, wherein the coating is adhered directly to the exterior of the plant seed.

16. The coated seed product as claimed in claim 1, the product comprising an intermediate layer adhered directly to the exterior of the plant seed, and wherein the coating is adhered to the intermediate layer.

17. The coated seed product as claimed in claim 16, wherein the intermediate layer forms a barrier layer between the exterior of the plant seed and the coating.

18. A method of forming a coated seed product comprising:
   forming a slurry comprising an evaporite mineral powder and a binder, wherein the evaporite mineral is polyhalite;
   applying the slurry to seeds so as to coat the seeds with the slurry; and
   drying the plant seeds to stabilise the coating.

* * * * *

UNITED STATES PATENT AND TRADEMARK OFFICE
CERTIFICATE OF CORRECTION

PATENT NO. : 9,949,424 B2
APPLICATION NO. : 15/316120
DATED : April 24, 2018
INVENTOR(S) : Robert Meakin It is certified that error appears in the above-identified patent and that said Letters Patent is hereby corrected as shown below:

On the Title Page

Please correct (73) Assignee by deleting "SIRIUS MINERALS PLC" and inserting the current assignee of --YORK POTASH LTD--

Signed and Sealed this
Twenty-fourth Day of January, 2023

Katherine Kelly Vidal
*Director of the United States Patent and Trademark Office*